United States Patent
Hirt (10) Patent No.: US 8,686,678 B2
(45) Date of Patent: Apr. 1, 2014

(54) ELECTRIC MOTOR, AND DEVICE FOR GENERATING A SIGNAL FOR CONTROLLING THE SAME

(75) Inventor: Markus Hirt, Villingen-Schwenningen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 13/138,253

(22) PCT Filed: Dec. 24, 2009

(86) PCT No.: PCT/EP2009/009267
§ 371 (c)(1),
(2), (4) Date: Jul. 25, 2011

(87) PCT Pub. No.: WO2010/083877
PCT Pub. Date: Jul. 29, 2010

(65) Prior Publication Data
US 2011/0279076 A1    Nov. 17, 2011

(30) Foreign Application Priority Data

Jan. 24, 2009  (DE) .......................... 10 2009 006 433

(51) Int. Cl.
*H02P 7/29* (2006.01)
*H03K 7/08* (2006.01)

(52) U.S. Cl.
USPC ............................ 318/503; 388/800; 388/937

(58) Field of Classification Search
USPC ......... 318/503, 523, 538, 539, 599, 625, 696, 318/400.17, 400.2, 255; 388/800–937
See application file for complete search history.

(56) References Cited

U.S. PATENT DOCUMENTS

| 4,847,648 | A | * | 7/1989 | Yamaguchi et al. | ............ 396/84 |
| RE35,124 | E | * | 12/1995 | Erdman et al. | ................ 318/599 |

(Continued)

FOREIGN PATENT DOCUMENTS

| DE | 40 29 556 | 9/1990 |
| DE | 199 07 950 | 9/2000 |

(Continued)

OTHER PUBLICATIONS

JP-09-009681-A machine translation of Azuma et al./Matsushita, Jan. 10, 1997.

(Continued)

*Primary Examiner* — Eduardo Colon Santana
*Assistant Examiner* — Said Bouziane
(74) *Attorney, Agent, or Firm* — Milton Oliver, Esq.; Oliver Intellectual Property LLC (57) ABSTRACT

An electric motor, having a stator (465), a rotor (470), and an apparatus for evaluating a signal provided for controlling said motor (110), comprises a receiving unit (430, 440) for receiving a control signal (PWM_mod), which is a pulse width modulated signal (PWM) onto which a data signal (DIR, DATA) is modulated. An evaluation unit (440) is provided for evaluating the modulated control signal (PWM_mod). The unit is configured to extract, from the modulated control signal (PWM_mod), data provided for operation of the motor (110). The control apparatus includes a signal generator (450) configured to generate, on the basis of the extracted or ascertained data provided for operation of the motor (110), at least one control signal for the motor (110), such as a commanded direction of rotation. Piggybacking other control data onto the PWM power level signal reduces hardware investment, by permitting omission of a signal lead which would otherwise be required in the motor structure.

13 Claims, 9 Drawing Sheets

(56) References Cited

U.S. PATENT DOCUMENTS

| | | | |
|---|---|---|---|
| 5,621,604 A | 4/1997 | Carlson | 361/166 |
| 5,949,202 A * | 9/1999 | Vlahu | 318/254.1 |
| 6,014,497 A * | 1/2000 | Kerkman et al. | 388/811 |
| 6,327,424 B1 * | 12/2001 | Stephan | 388/804 |
| 6,469,469 B1 * | 10/2002 | Chambers et al. | 318/801 |
| 7,068,191 B2 | 6/2006 | Kuner et al. | 341/30 |
| 7,096,134 B2 | 8/2006 | Miller, Jr. | 702/79 |
| 7,124,655 B2 | 10/2006 | Blossfeld | 73/866.1 |
| 7,642,664 B1 * | 1/2010 | Andrews et al. | 290/1 A |
| 8,427,084 B2 * | 4/2013 | Kobayashi | 318/257 |
| 2002/0191070 A1 * | 12/2002 | D. | 347/253 |
| 2004/0001542 A1 | 1/2004 | Miller, Jr. | 375/238 |
| 2004/0158378 A1 * | 8/2004 | Woller et al. | 701/49 |
| 2005/0057200 A1 * | 3/2005 | Akiyama | 318/66 |
| 2006/0208722 A1 * | 9/2006 | Takemasa et al. | 324/200 |
| 2006/0291820 A1 * | 12/2006 | Kobayashi | 388/811 |
| 2007/0019934 A1 * | 1/2007 | Ku | 388/811 |
| 2007/0098373 A1 * | 5/2007 | Saito et al. | 388/811 |
| 2010/0043409 A1 | 2/2010 | Naydenov et al. | 60/287 |
| 2010/0171452 A1 * | 7/2010 | Fukushima | 318/400.11 |
| 2011/0018478 A1 * | 1/2011 | Kobayashi | 318/257 |

FOREIGN PATENT DOCUMENTS

| | | |
|---|---|---|
| DE | 101 19 471 | 10/2002 |
| EP | 0 607 030 | 7/1994 |
| EP | 2066021 A2 * | 6/2009 |
| JP | 62085763 A * | 4/1987 |
| JP | 09-009 681 | 1/1997 |
| JP | 2002101685 A * | 4/2002 |
| JP | 2009131064 A * | 6/2009 |
| WO | WO 2008-087153 | 10/2002 |
| WO | WO 2008141407 A1 * | 11/2008 |
| WO | WO 2010047221 A1 * | 4/2010 |

OTHER PUBLICATIONS

JPO English abstract of JP-09-009681-A, Inverter, pub. Jan. 10, 1997.

\* cited by examiner

ELECTRIC MOTOR, AND DEVICE FOR GENERATING A SIGNAL FOR CONTROLLING THE SAME

CROSS-REFERENCE

This application is a §371 of PCT/EP2009/09267, filed 24 Dec. 2009 and published 29 Jul. 2010 as WO 2010-083877-A1, and further claims priority from German application 10 2009 006 433.8, filed 24 Jan. 2009, the entire content of which is incorporated by reference.

FIELD OF THE INVENTION

The invention relates to an electric motor and to an apparatus for generating a signal for controlling an electric motor.

BACKGROUND

It is known from EP 1 413 045 B1 and corresponding U.S. Pat. No. 7,068,191, KUNER & SCHONDELMAIER, to control electric motors using pulse width modulation (PWM). The control pulses are, in this context, applied to the motor in the form of a PWM signal having a constant clock frequency (period length T=constant). The duration t of the current pulses or associated pulse off-times (T−t) is variable; the rotation speed of the motor is specified by the pulse duty factor t/T of the PWM signal. A change in the pulse duty factor t/T correspondingly produces a change in the rotation speed.

Whereas rotation speed control of the electric motor can be performed using a suitable PWM signal, data that must likewise be transferred to the motor while it is in operation, for example a desired rotation direction, must (according to the prior art) be transferred to the motor via an additional lead.

SUMMARY OF THE INVENTION

An object of the present invention is to make available a novel electric motor and a novel apparatus for generating a signal for controlling the same.

This object is achieved by an apparatus for generating a PWM signal with additional control data modulated thereon, for controlling an electric motor, by a corresponding method including steps of generating the PWM signal and modulating the additional data thereon, and by an electric motor structure including a control circuit which receives the specially modulated control signal, extracts therefrom at least one control command, and generates a corresponding driving signal for the motor.

In this context, a data signal is modulated onto a PWM signal so that an additional lead for transferring the data signal is not necessary.

BRIEF FIGURE DESCRIPTION

Further details and advantageous refinements of the invention are evident from the exemplifying embodiments that are described below and depicted in the drawings, in which.

DETAILED DESCRIPTION

Figure 1:
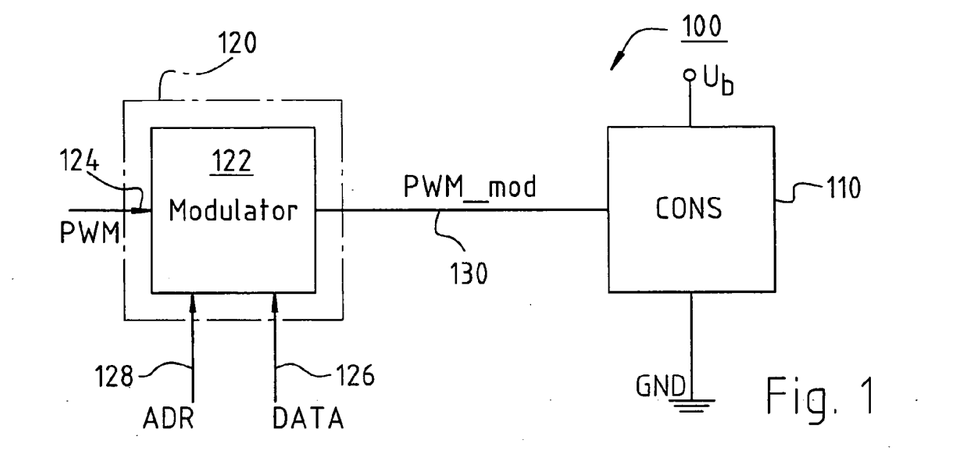
FIG. 1 is a block diagram of an arrangement having a control apparatus 120 and an electrical load 110.

FIG. 1 shows an arrangement 100 having an electrical load or consumer CONS 110 and a control apparatus 120. It contains a modulator 122, to whose one input 124 a PWM signal is applied during operation, as depicted as an example in FIG. 7. Modulator 122 further has an input 126 to which data can be applied, e.g. a signal for the desired rotation direction of a motor, and if applicable further inputs, e.g. an input 128 for addressing a device, e.g. a motor M1 or M2 as depicted in FIG. 5.

Figure 5:
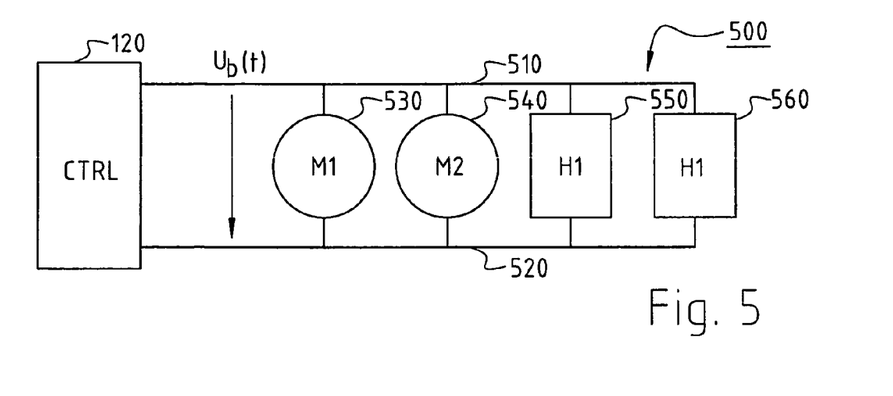
FIG. 5 is a block diagram of an arrangement having a control apparatus 120 and multiple electrical loads, namely two motors 530 and 540 and two heating elements 550 and 560.
Figure 8:
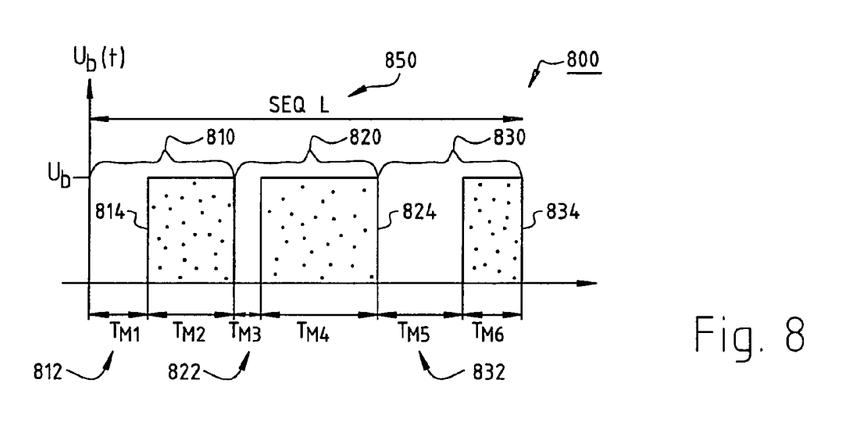
FIG. 8 is a diagram showing a first control sequence generated on the basis of the PWM signal of FIG. 7.
Figure 9:
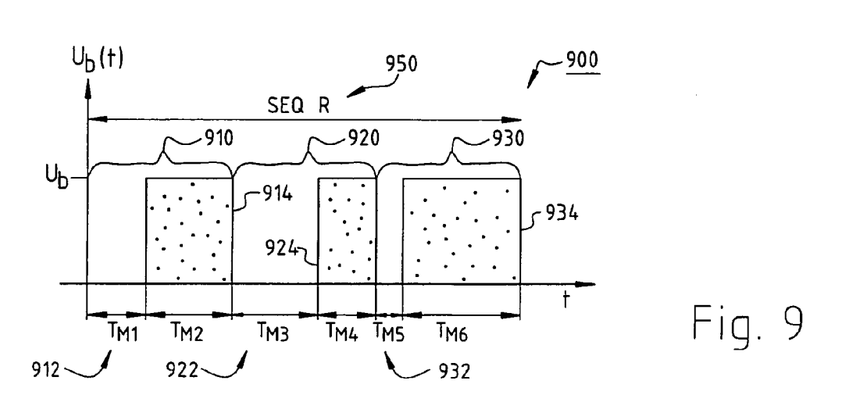
FIG. 9 is a diagram showing a second control sequence generated on the basis of the sequence of the PWM signal of FIG. 7.

The PWM signal (of input 124) can be modulated with the data at input 126 or at input 128, as depicted in FIGS. 8 and 9, so that, for example, at output 130 of modulator 122 a modulated PWM signal PWM_mod is obtained with which it is possible to control the rotation direction and power level of motor M1 of FIG. 5 via a single lead, or alternatively the addressing of a motor M1 or M2 in FIG. 5, in order to transfer data to it.

According to an embodiment, the control signal PWM_mod specifies an electrical power level, to be delivered to load 110 from a voltage source Ub, and contains data that are necessary for the operation of load 110, as will be described below with reference to FIGS. 8 and 9. These data describe, for example, an operating parameter of load 110 that specifies an operating mode of that load. For example, the load is operated in a first operating mode when the data of signal PWM_mod specify a first operating parameter, and in a second operating mode, when those data specify a second operating parameter.

To illustrate the invention, a description is given below of preferred exemplifying embodiments, in which load 110 is an electric motor that can be operated clockwise or counterclockwise. Operating data or operating parameters correspondingly determine an associated rotation direction; for example, a first operating parameter means "clockwise" and a second operating parameter means "counterclockwise." Electric motor 110 can serve to drive a pump that is operable both forward and backward, the power level being individually modifiable, in both rotation directions, by the signal PWM_mod.

Figure 2:
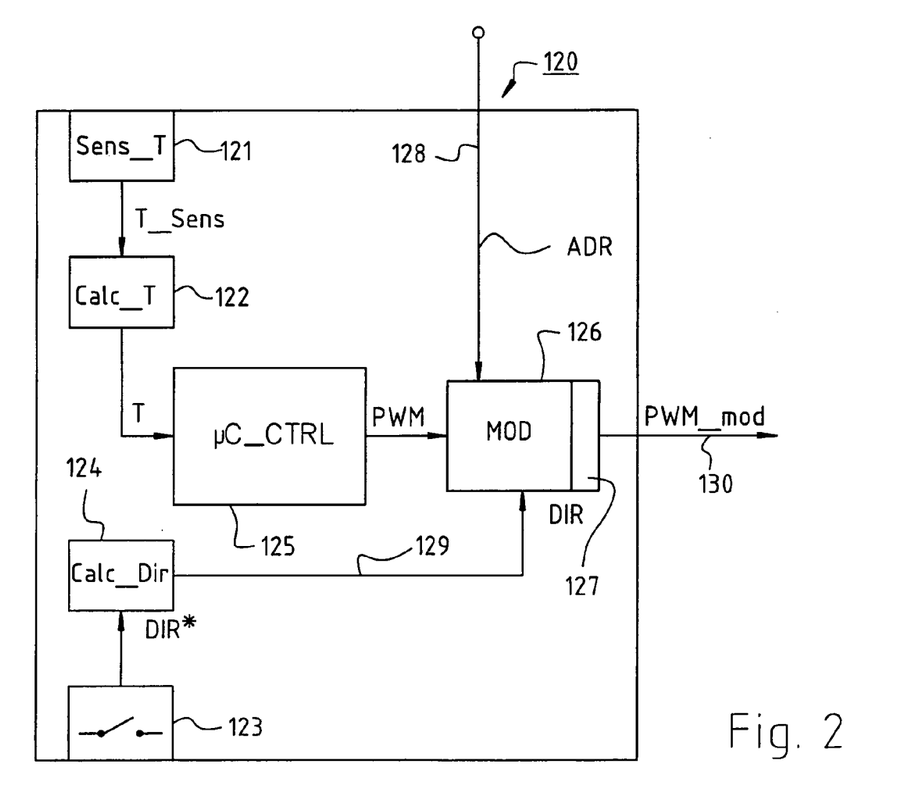
FIG. 2 is a block diagram of an embodiment of control apparatus 120 of FIG. 1.

FIG. 2 shows, by way of example, an implementation of control apparatus 120 having a signal generator 126 for generating a modulated control signal PWM_mod. Generator 126 has a transmitting unit 127. The generator has applied to it, on the one hand, a signal PWM from a control unit 125 and, on the other hand, a rotation direction signal DIR from a device 124 via a lead 129, which signal specifies (in FIG. 1) the rotation direction of a motor 110 that can constitute load 110.

Device 124 is connected here to a rotation direction specifier 123, e.g. a switch contact that generates a signal DIR* when actuated. Upon reception of a signal DIR*, device 124 generates a corresponding rotation direction signal DIR that is applied to modulator 126.

Signal PWM can derive from any source. Here control unit 125 is connected to a device 122 to which a temperature signal T_Sens is delivered from a temperature sensor 121. Sensor 121 can be arranged, for example, on an object to be cooled, in order to sense its temperature. Device 122 derives, from T_sens, a temperature signal, and sends a corresponding signal T to control unit 125.

The latter is implemented, for example, using a microcontroller that generates the pulse-width-modulated signal PWM in a program-controlled manner. This signal has a pulse duty factor that is dependent on temperature signal T and regulates an electrical power level to be applied to load 110 (FIG. 1). Correspondingly, a high electrical power level can be delivered to load 110 when the present temperature T is high, and a low power level at a low temperature, in order, for example in the case of a motor 110, to influence the rotation speed correspondingly. Motor 110 can also be shut off when the present temperature T falls below a predetermined threshold value. A suitable method for generating the signal PWM is known from EP 1 413 045 B1, to whose entire content reference is made, in order to avoid lengthiness.

In an embodiment, signal generator 126 is configured to generate the modulated control signal PWM_mod to drive load 110. For this, signal generator 126 modulates the data signal DIR onto the signal PWM in such a way that the pulse duty factor of the signal PWM can be extracted from the modulated control signal PWM_mod. The modulated control signal PWM_mod thus specifies, by its pulse duty factor, the electrical power level to be applied to load 110, while other data necessary for the operation of load 110 are modulated onto that signal. Transmitting unit 127 then transfers the modulated control signal PWM_mod via a control lead 130 to load 110, as shown in FIG. 1.

Figure 3:
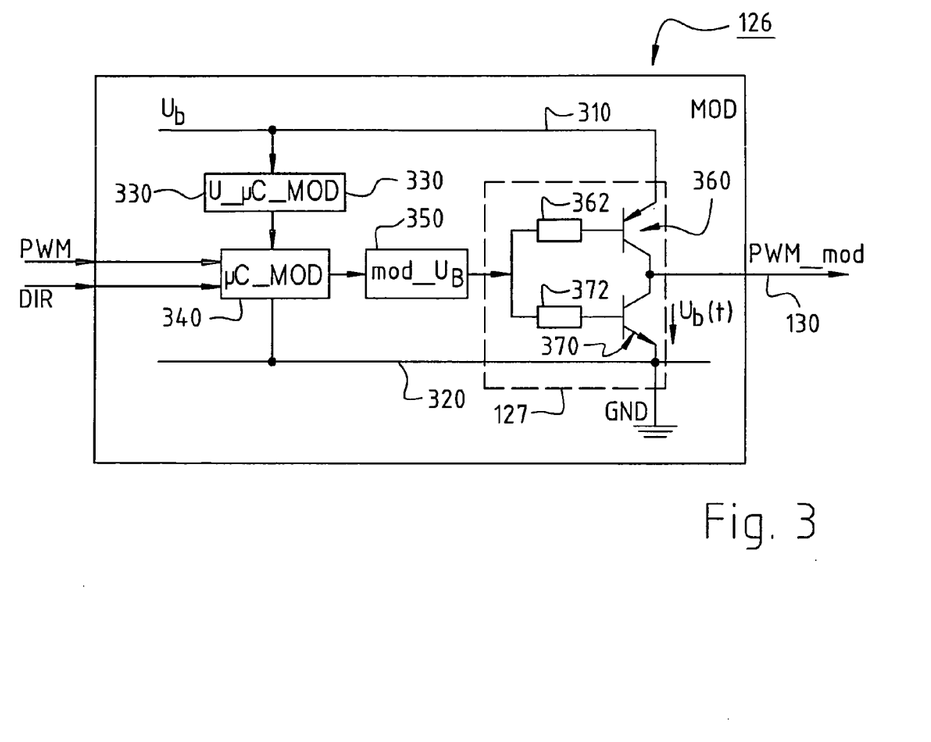
FIG. 3 is a block diagram of an embodiment of signal generator 126 of FIG. 2.

FIG. 3 shows, by way of example, an implementation of signal generator 126 of FIG. 2 that is equipped with transmitting unit 127 and to which the pulse width modulated signal PWM and data signal DIR are applied. Signal generator 126 has a signal lead 310 for a voltage Ub, and a ground lead 320. Lead 310 is connected to a voltage regulator 330 that is connected on its output side to a control element 340, e.g. a microcontroller, connected to ground lead 320. Voltage regulator 330 is configured to supply control element 340 with a substantially constant operating voltage. Control element 340 is connected, on its output side, to a driver 350 for transmitting unit 127, and serves to process the pulse width modulated signal PWM and data signal DIR.

Transmitting unit 127 has two resistors 362, 372 that are connected, on the one hand, to driver 350 and, on the other hand, to a respective associated semiconductor switch 360, 370. Semiconductor switch 360 is a PNP transistor whose base is connected to resistor 362. Its emitter is connected to lead 310, and its collector to transfer lead 130. Semiconductor switch 370 is an NPN transistor whose base is connected to resistor 372. Its emitter is connected to ground lead 320, and its collector to transfer lead 130.

When signal generator 126 is in operation, control element 340 specifies the pulse duty factor of the pulse width modulated signal PWM, and the data or operating parameters that are specified by the data signal DIR. Control element 340 then drives semiconductor switches 360, 370 via driver 350 and resistors 362, 372 so that they generate, from the supply voltage Ub, a control voltage Ub(t) that constitutes the control signal PWM_mod that is transferred to motor 110 on lead 130. As already mentioned above, this control signal PWM_mod has the pulse duty factor of the pulse width modulated signal PWM, and carries the data of data signal DIR.

An example of a method of generating the control signal PWM_mod is described below, with reference to FIG. 6, in order to illustrate the manner of operation of control element 340 and of driver 350.

Figure 4:
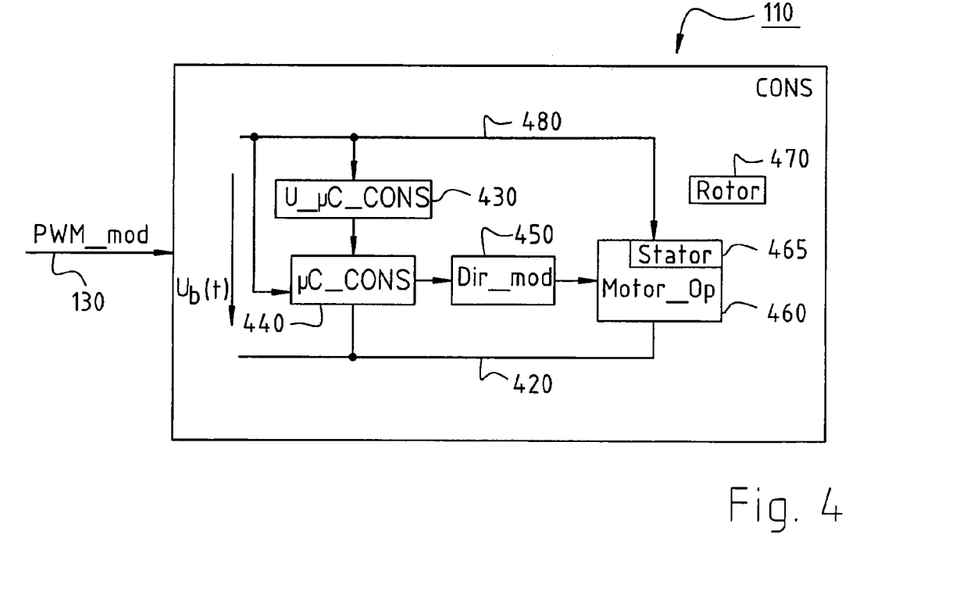
FIG. 4 is a block diagram of an embodiment of electrical load 110 of FIG. 1.

FIG. 4 shows an exemplifying embodiment of the electric motor 110 of FIG. 1, which motor represents an example of an electrical load and comprises a supply lead 480 as well as a ground lead 420. The control signal PWM_mod, which is present at lead 480 as voltage Ub(t), is applied to electric motor 110 via lead 130 of FIG. 3. This voltage is delivered via lead 480 to an energy buffer 430, and to an evaluation unit 440 connected to ground lead 420, which unit is likewise connected on the input side of energy buffer 430. Energy buffer 430 and evaluation unit 440 thus constitute a receiving unit for receiving the control signal PWM_mod from lead 130.

Evaluation unit 440 is connected, on the output side, to a signal generator 450 that is, in turn, connected on the output side to motor components 460 of motor 110. These components encompass, for example, a stator 465 having at least one stator winding and an associated power stage transistor. Stator 465, whose at least one stator winding is connected to lead 480 and to ground lead 420, has a rotor 470 associated with it.

When electric motor 110 is in operation, the signal that is specified by the pulse duty factor of the control signal PWM_mod and is to be applied to the motor is delivered by the voltage Ub(t), conveyed on lead 480, to the at least one stator winding of stator 465, while evaluation unit 440 evaluates the control signal PWM_mod in order to ascertain the data provided for operation of the motor, and the corresponding operating parameter, on the basis of the control signal PWM_mod. As a function of the operating parameter that is determined, signal generator 450 is driven, in turn, in order to generate a drive signal for the associated power stage transistors of stator 465, and in order to operate the motor in an operating mode corresponding to the ascertained operating parameter. For example, the drive signal can be configured to commutate corresponding power stage transistors of stator 465 in such a way that the motor is operated clockwise when the operating parameter specifies clockwise running.

An example of a method of evaluating the control signal PWM_mod is described below, with reference to FIG. 13, in order to illustrate the manner of operation of evaluation unit 440 and signal generator 450.

FIG. 5 shows an arrangement 500 in which the control voltage Ub(t) of FIG. 3, generated by control apparatus 120, which voltage constitutes the control signal PWM_mod of FIG. 1, is delivered via a transfer lead 510 to a plurality of exemplifying electrical loads 530, 540, 550, 560 connected to a ground lead or bus 520. These can be configured in a manner similar to electric motor 110 of FIG. 4, in order to perform an evaluation of the control signal PWM_mod and to be operated as a function of an operating parameter determined in that context. For example, load 530 can be implemented by electric motor 110 of FIG. 4, whereas load 540 is rotatable in only one rotation direction and can thus be implemented without the components described in FIG. 4 for evaluating the signal PWM_mod. As an alternative to this, both loads 530, 540 can be implemented like electric motor 110 of FIG. 4, while loads 550, 560 represent, by way of example, heating elements that can be implemented without the components described in FIG. 4 for evaluating the signal PWM_mod.

Figure 6:
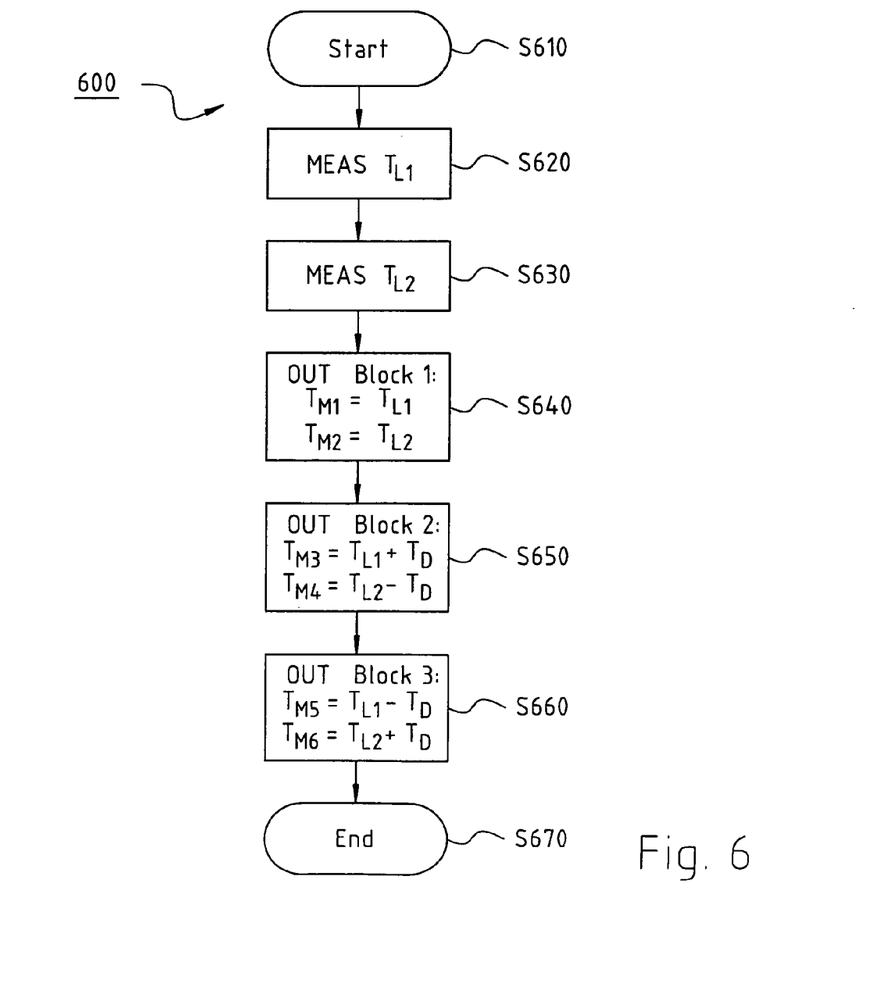
FIG. 6 is a flow chart showing a method for generating a control signal, according to an embodiment.

FIG. 6 shows an exemplifying method 600 for generating the control signal PWM_mod of FIGS. 1 to 4, which method is executed, for example, by signal generator 126 of FIG. 3. It begins in step S610 with the reception or reading in of the pulse width modulated signal PWM of FIG. 2.

Figure 7:
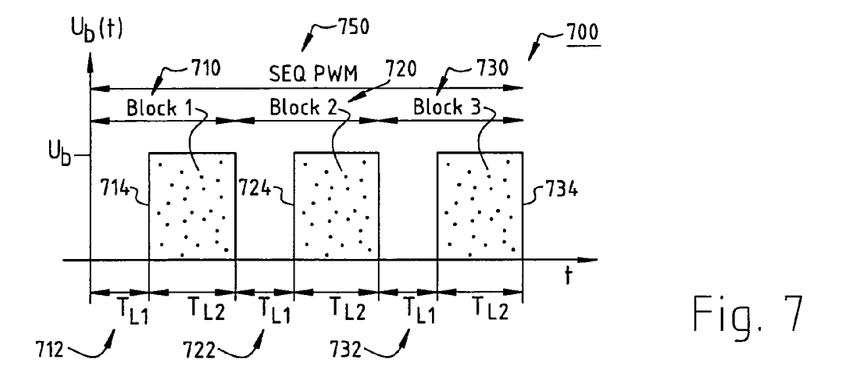
FIG. 7 is a diagram showing a sequence of a PWM signal for power control, according to an embodiment.

FIG. 7 shows an exemplifying diagram 700 of a pulse width modulated signal PWM that is formed from the supply voltage Ub of FIG. 3 and has successive signal elements; for simplification, only three signal elements 710, 720, 730 (Block 1, Block 2, Block 3) are shown in FIG. 7. According to an embodiment, these constitute a signal sequence 750 (SEQ PWM). Signal elements 710, 720, 730 have a respective pulse off-time 712, 722, 732 having a predetermined constant off-time duration $T_{L1}$, and subsequent thereto a respective pulse 714, 724, 734 having a predetermined constant pulse duration $T_{L2}$. The off-time duration $T_{L1}$ and pulse duration $T_{L2}$ are each specified as a function of the power level to be applied to electric motor 110; the pulse duty factor $T_{L2}/(T_{L1}+T_{L2})$ calculated from the off-time duration $T_{L1}$ and pulse duration $T_{L2}$ determines the power level to be applied, i.e. the higher the power level to be set, the greater the pulse duty factor.

Referring again to FIG. 6, in step S620 the off-time duration $T_{L1}$ of signal elements 710, 720, 730 of FIG. 7 is measured. Their pulse duration $T_{L2}$ is then measured in step S630. Then, in steps S640 to S660, the data signal DIR of FIG. 2 is modulated onto the signal PWM; according to an embodiment, at least the off-time duration $T_{L1}$ and pulse duration $T_{L2}$ of at least two successive signal elements of the signal PWM are modified, while maintaining its pulse duty factor, as a function of the data of the data signal DIR. A description will be given below, by way of example, of a process of modulating on a data signal DIR which comprises data that specify, as an operating parameter, a clockwise direction (DIR=R) for electric motor 110 of FIGS. 1 and 4.

In step S640, a first signal element of the control signal PWM_mod is generated; this has, for example, an off-time duration $T_{M1}$ and a pulse duration $T_{M2}$ that correspond to the off-time duration and pulse duration of signal element 710 of FIG. 7, i.e. $T_{M1}=T_{L1}$ and $T_{M2}=T_{L2}$. In step S650, a second signal element, subsequent to the first signal element, is generated. This has an off-time duration $T_{M3}$ that corresponds to the off-time duration $T_{L1}$ of signal element 720 of FIG. 7 lengthened by an amount equal to a predetermined duration $T_D$ i.e. $T_{M3}=T_{L1}+T_D$.

Its pulse duration $T_{M4}$ corresponds to pulse duration $T_{L2}$ of signal element 720 of FIG. 7 shortened by an amount equal to the duration $T_D$, i.e. $T_{M4}=T_{L2}-T_D$.

In step 660, a third signal element subsequent to the second signal element is generated. This has an off-time duration $T_{M5}$ that corresponds to the off-time duration $T_{L1}$ of signal element 730 of FIG. 7 shortened by an amount equal to the duration $T_D$, i.e. $T_{M5}=T_{L1}-T_D$. Its pulse duration $T_{M6}$ corresponds to pulse duration $T_{L2}$ of signal element of FIG. 7 lengthened by an amount equal to duration $T_D$, i.e. $T_{M6}=T_{L2}+T_D$. A modulated control signal PWM_mod generated in this manner is shown by way of example in FIG. 9.

The method 600 then ends at step S670 with transfer of the control signal PWM_mod to electric motor 110, as described above with reference to FIGS. 3 and 4.

As already mentioned, the control signal PWM_mod generated in accordance with the method 600 of FIG. 6 controls clockwise running of electric motor 110 of FIGS. 1 and 4. In order to generate a control signal PWM_mod for counterclockwise running of motor 110, the second signal element generated in step S650 can be configured with an off-time duration $T_{M3}$ that corresponds to the off-time duration $T_{L1}$ of signal element 720 of FIG. 7, shortened by an amount equal to a predetermined duration $T_D$, i.e. $T_{M3}=T_{L1}-T_D$, while its pulse duration $T_{M4}$ corresponds to pulse duration $T_{L2}$ of signal element 720 of FIG. 7, lengthened by the duration $T_D$, i.e. $T_{M4}=T_{L2}+T_D$.

In addition, the third signal element generated in step S660 can have an off-time duration $T_{M5}$ that corresponds to the off-time duration $T_{L1}$ of signal element 730 of FIG. 7, lengthened by an amount equal to duration $T_D$, i.e. $T_{M5}=T_{L1}+T_D$, while its pulse duration $T_{M6}$ corresponds to pulse duration $T_{L2}$ of signal element 730 of FIG. 7, shortened by the duration $T_D$, i.e. $T_{M6}=T_{L2}-T_D$.

A control signal PWM_mod generated in this manner is shown in FIG. 8.

Be it noted, however, that the use of method 600 to generate the second and third signal elements for modulated control signals PWM_mod that are suitable for controlling clockwise or counterclockwise running of electric motor 110 of FIGS. 1 and 4 is described only by way of example.

A description is given below, with reference to FIGS. 14 to 17, of how separate driving of different devices, for example motors M1 and M2 of FIG. 5, is possible.

FIG. 8 shows a diagram 800 of an exemplifying signal sequence 850 (SEQ L) of a control signal PWM_mod that, in accordance with an embodiment, specifies the "counterclockwise" operating parameter for motor 110 of FIGS. 1 and 4 and was generated on the basis of the pulse width modulated signal PWM of FIG. 7. Signal sequence 850 correspondingly has three successive signal elements 810, 820, 830 having pulse off-times 812, 822, 832 and pulses 814, 824, and 834 respectively subsequent thereto.

First signal element 810, which serves as a reference signal element, has pulse off-time 812 having an off-time duration $T_{M1}$ and pulse 814 having a pulse duration $T_{M2}$, which correspond to the off-time duration and pulse duration of signal element 710 of FIG. 7, i.e. $T_{M1}=T_{L1}$ and $T_{M2}=T_{L2}$.

Second signal element 820 has pulse off-time 822 having an off-time duration $T_{M3}$ and pulse 824 having a pulse duration $T_{M4}$, where $T_{M3}=T_{L1}-T_D$ and $T_{M4}=T_{L2}+T_D$.

Third signal element 830 has pulse off-time 832 having an off-time duration $T_{M5}$ and pulse 834 having a pulse duration $T_{M6}$, where $T_{M5}=T_{L1}+T_D$ and $T_{M6}=T_{L2}-T_D$.

The pulse duty factor of signal sequence 850 corresponds to the pulse duty factor of signal sequence 750 of FIG. 7, i.e. $T_{L2}/(T_{L1}+T_{L2})=T_{M2}+T_{M4}+T_{M6})/(T_{M1}+T_{M2}+T_{M3}+T_{M4}+T_{M5}+T_{M6})$.

To this extent, as described above, the electrical signal applied by the control signal PWM_mod to motor 110 corresponds to the one that was applied to motor 110 by the pulse width modulated signal PWM of FIG. 7.

FIG. 9 shows a diagram 900 of an exemplifying signal sequence 950 (SEQ R) of a control signal PWM_mod that, in accordance with an embodiment, specifies the "clockwise" operating parameter for motor 110 of FIGS. 1 and 4 and was generated on the basis of the pulse width modulated signal PWM of FIG. 7. Signal sequence 950 has three successive signal elements 910, 920, 930 having pulse off-times 912, 922, 932 and pulses 914, 924, and 934 respectively subsequent thereto.

First signal element 910, which once again serves as a reference signal element, has pulse off-time 912 having an off-time duration $T_{M1}$ and pulse 914 having a pulse duration $T_{M2}$, which correspond to the off-time duration and pulse duration of signal element 710 of FIG. 7, i.e. $T_{M1}=T_{L1}$ and $T_{M2}=T_{L2}$. Second signal element 920 has pulse off-time 922 having an off-time duration $T_{M3}$ and pulse 924 having a pulse duration $T_{M4}$, where $T_{M3}=T_{L1}+T_D$ and $T_{M4}=T_{L2}-T_D$.

Third signal element 930 has pulse off-time 932 having an off-time duration $T_{M5}$ and pulse 934 having a pulse duration $T_{M6}$, where $T_{M5}=T_{L1}-T_D$ and $T_{M6}=T_{L2}+T_D$.

The pulse duty factor of signal sequence 950 corresponds to the pulse duty factor of signal sequence 850 of FIG. 8 and signal sequence 750 of FIG. 7.

Figure 10:
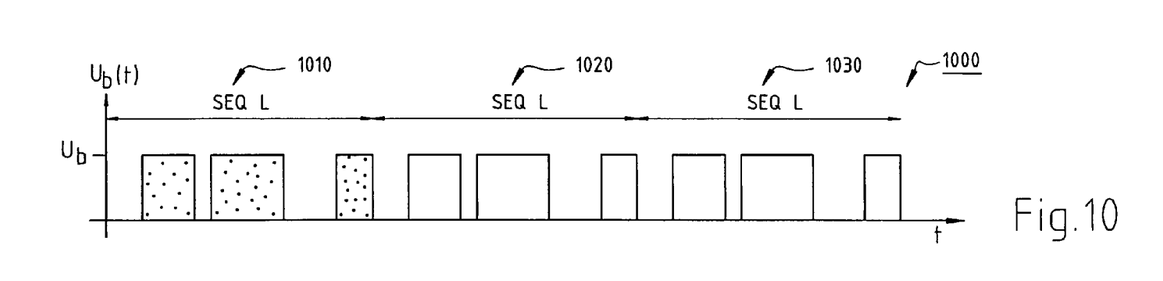
FIG. 10 is a diagram showing a first control signal generated on the basis of the control sequence of FIG. 8.

FIG. 10 shows a diagram 1000 of a first embodiment of a control signal PWM_mod that specifies the "counterclockwise" operating parameter for motor 110 of FIGS. 1 and 4 and was generated on the basis of the pulse width modulated signal PWM of FIG. 7. It has a plurality of successive signal sequences; to simplify the depiction, only three signal sequences 1010, 1020, 1030 are illustrated. These all correspond to the counterclockwise sequence 850 of FIG. 8 or to a signal sequence defining the desired operating parameter, which sequence is generated continuously upon generation of the control signal PWM_mod.

Figure 11:
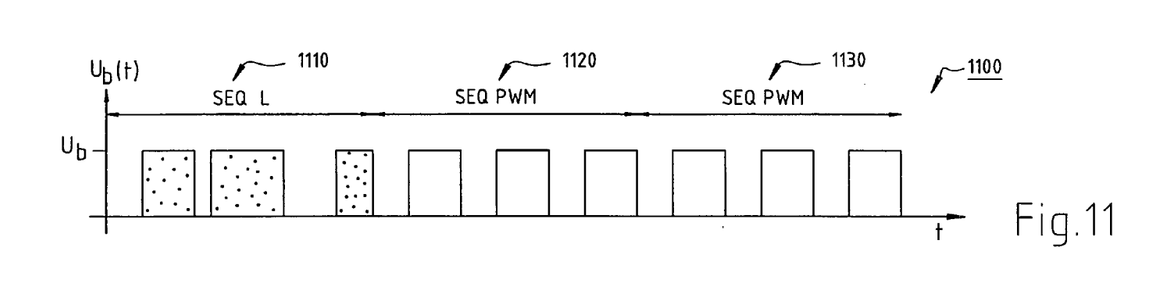
FIG. 11 is a diagram showing a second control signal generated on the basis of the control sequence of FIG. 8.

FIG. 11 shows a diagram 1100 of a second embodiment of a counterclockwise control signal PWM_mod having three exemplifying signal sequences 1110, 1120, 1130; sequence 1110 corresponds to the counterclockwise sequence 850 of FIG. 8, and sequences 1120, 1130 correspond to PWM sequence 750 of FIG. 7. According to the second embodiment, the counterclockwise sequence 850 of FIG. 8, or a signal sequence defining the desired operating parameter, is correspondingly generated only once, when driving of motor 110 of FIGS. 1 and 4 begins.

Figure 12:
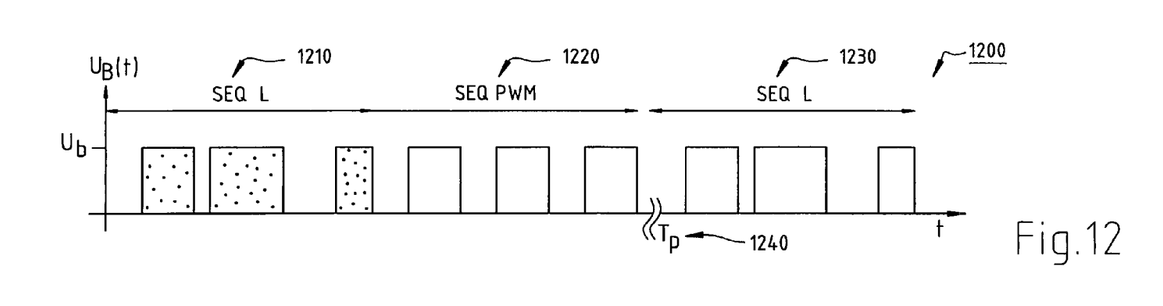
FIG. 12 is a diagram showing a third control signal generated on the basis of the control sequence of FIG. 8.

FIG. 12 shows a diagram 1200 of a third embodiment of a counterclockwise control signal PWM_mod having three exemplifying signal sequences 1210, 1220, 1230; sequences 1210 and 1230 correspond to the counterclockwise sequence 850 of FIG. 8, and sequence 1220 corresponds to PWM sequence 750 of FIG. 7. Sequence 1230 is offset, by way of example, from sequence 1210 by a predetermined duration 1240 ($T_p$). According to the third embodiment, the counterclockwise sequence 850 of FIG. 8, or a signal sequence defining the desired operating parameter, is correspondingly generated repeatedly after each expiration of the predetermined duration 1240 ($T_p$).

Figure 13:
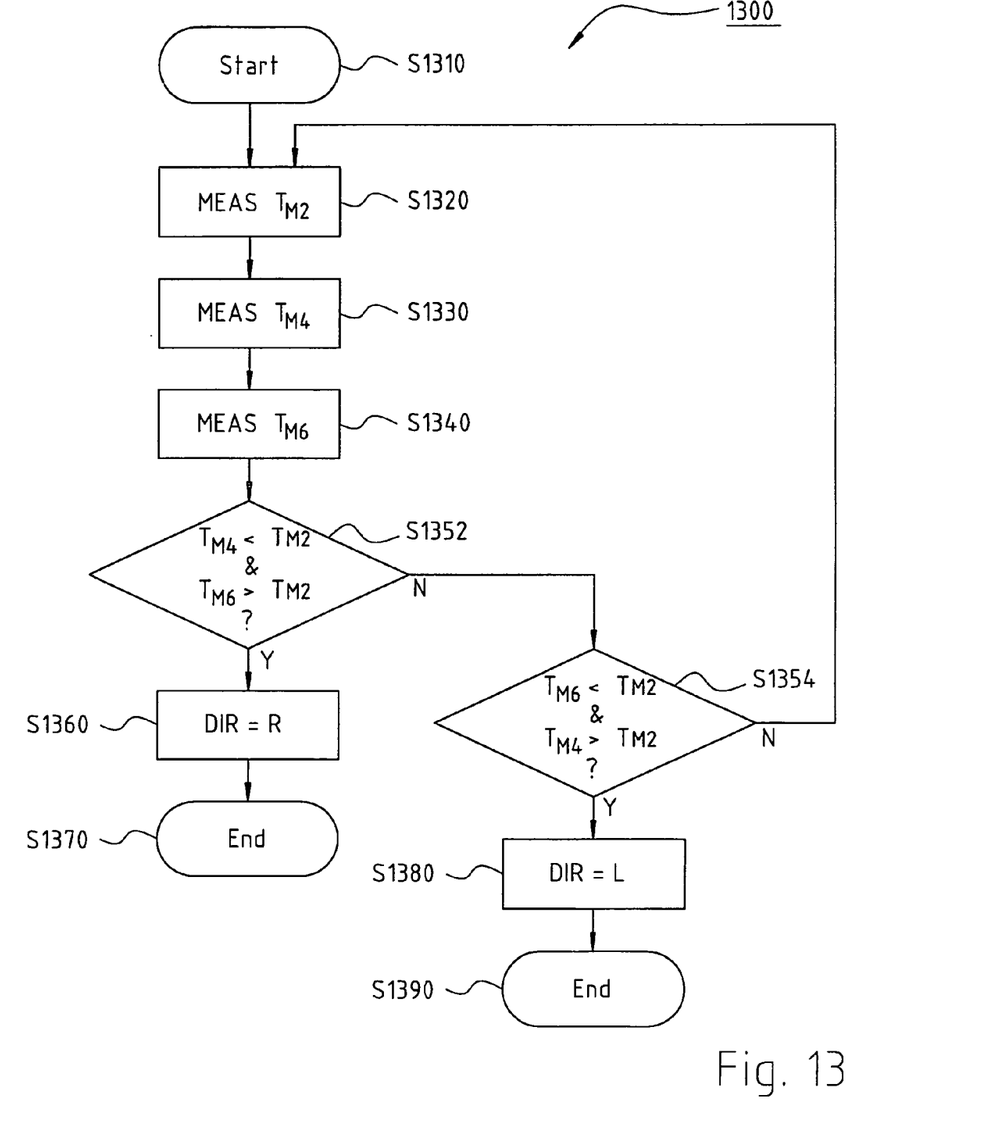
FIG. 13 is a flow chart showing a method for evaluating such a control signal.

FIG. 13 shows, by way of example, a method 1300 of evaluating the control signal PWM_mod of FIGS. 8 to 12 that is executed by evaluation unit 440 of FIG. 4. This method begins in step S1310 with reception or reading in of the control signal PWM_mod. Method 1300 for evaluating the pulse durations of the signal elements of control signal PWM_mod of FIG. 8 is described below. Be it noted that the method can be applied analogously to their off-time durations.

In step S1320, pulse duration $T_{M2}$ of first signal element 810 is measured. Pulse duration $T_{M4}$ of second signal element 820 is then measured in step S1330, and in step S1340 pulse duration $T_{M6}$ of third signal element 830 is measured.

Step S1352 tests whether pulse duration $T_{M2}$ is greater than pulse duration $T_{M4}$ and less than pulse duration $T_{M6}$. As described above with reference to FIG. 9, this is the case if the control signal PWM_mod contains signal sequence 950 of FIG. 9 and thus specifies the "clockwise" operating parameter (DIR=R) for motor 110 of FIGS. 1 and 4, which is ascertained in step S1360. In this case, method 1300 ends at step S1370, in which evaluation unit 440 of FIG. 4 drives signal generator 450 of FIG. 4 so that the latter, in turn, generates a driving signal for the associated power stage transistors of stator 465 of FIG. 4, in order to operate motor 110 clockwise.

In the present exemplifying embodiment of control signal PWM_mod of FIG. 8, however, the result in step S1352 is "No," and proceeding from step S1352, a test is made in step S1354 as to whether pulse duration $T_{M2}$ is less than pulse duration $T_{M4}$ and greater than pulse duration $T_{M6}$. If that is the case here, the "counterclockwise" operating parameter (DIR=L) for motor 110 of FIGS. 1 and 4 is determined in step S1380. Method 1300 then ends at step S1390, in which evaluation unit 440 of FIG. 4 drives signal generator 450 of FIG. 4 so that the latter, in turn, generates a control signal for the associated power stage transistors of stator 465 of FIG. 4, in order to operate motor 110 counterclockwise. Otherwise, the method can return, for example, to step S1320, in order to be repeated in a looped manner until ascertainment of a suitable operating parameter is possible.

Figure 14:
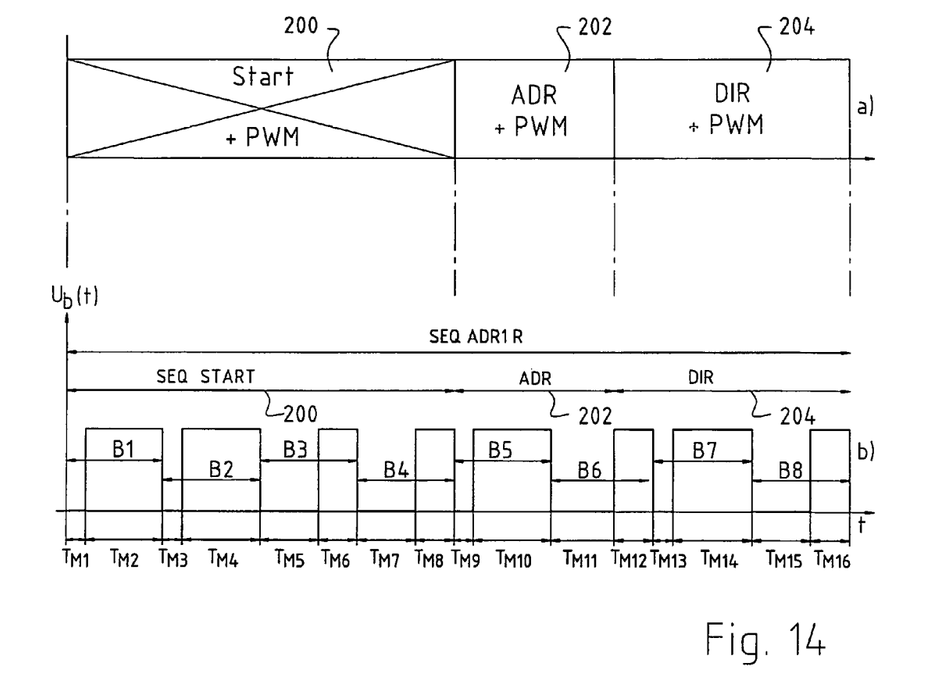
FIG. 14 is a diagram showing a control sequence which serves, in the context of the arrangement according to FIG. 5, to address the desired motor of the two motors 530 (M1) or 540 (M2), to transmit to it a rotation direction signal DIR, and to control the power level (or rotation speed) of that motor by means of a simultaneously transmitted pulse duty factor PWM.

FIG. 14 shows a signal sequence which serves to modulate onto the PWM signal, at input 124 of FIG. 1, firstly a start signal 200, then an address signal ADR 202 (e.g. for one of motors 530, 540 of FIG. 5), and then a rotation direction signal DIR 204 for said motors. According to FIG. 14b, eight signal blocks B1 to B8 corresponding to these specifications are generated for this purpose, as described later on with reference to FIG. 16.

Figure 15:
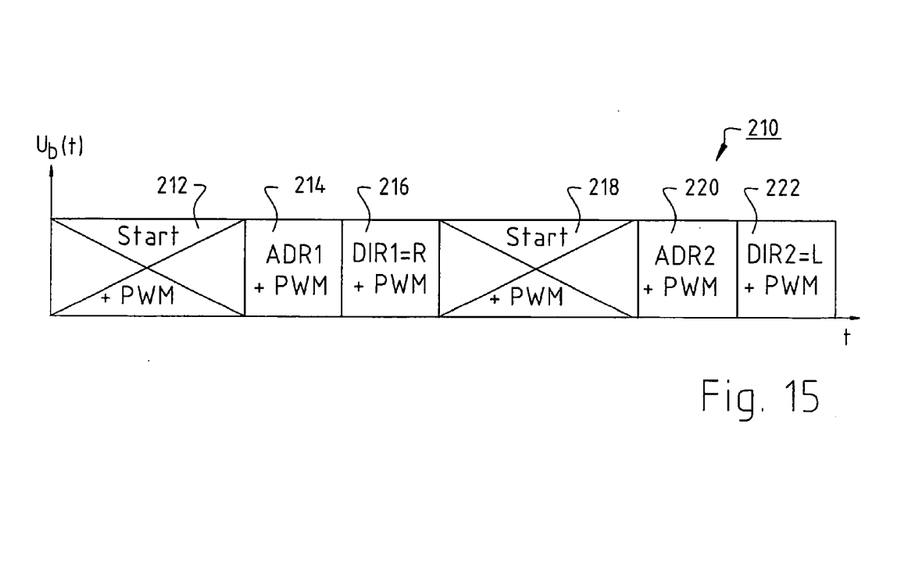
FIG. 15 is a diagram showing a control sequence for the arrangement according to FIG. 5, in which after a start signal, firstly motor M1 is addressed and receives a PWM signal, and then the clockwise rotation direction signal (R) is transferred to motor 1 together with the PWM signal; this is again followed by the start signal, and after that an analog signal sequence for motor M2.

FIG. 15 shows a signal sequence 210 which serves to set the rotation direction of motor 530 (FIG. 5) to clockwise (DIR1=R) and the rotation direction of motor 540 to counterclockwise (DIR2=L). A start signal 212, which is modulated onto PWM signal 124 (FIG. 1), is followed by an address signal ADR1 214 for motor 530 and then, in part 216, by a rotation direction signal DIR1=R, i.e. clockwise.

This is then followed by a new start signal 218 which can be identical to start signals 200 and 212, and then at 220 by an address signal ADR2 for motor 540 and then, at 222, by the rotation direction signal DIR2=L, i.e. counterclockwise, for that motor. The PWM signal at input 124 is continuously measured. The value that is transferred can be buffered in the relevant motor.

Figure 16:
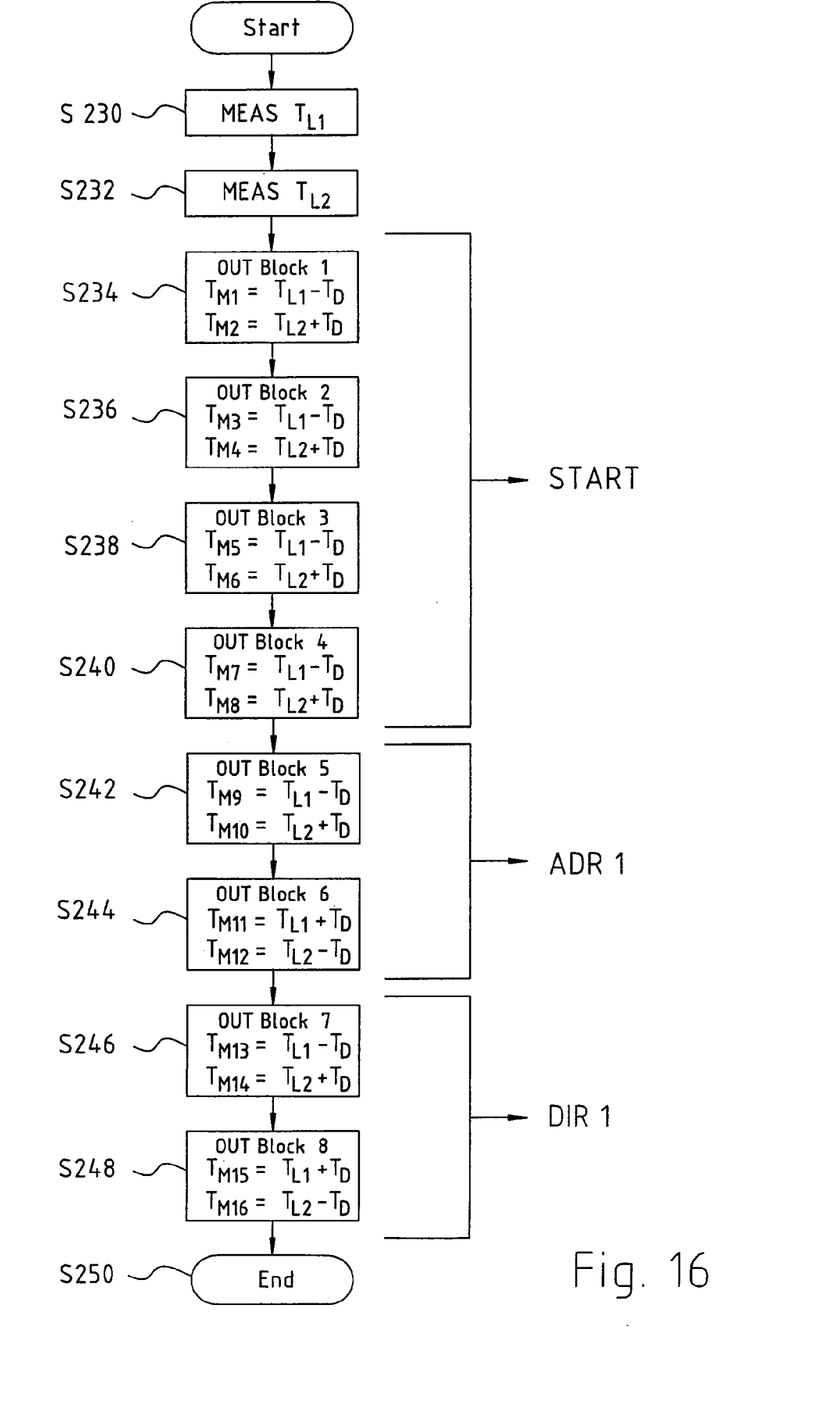
FIG. 16 is a flow chart showing the sequence upon generation of the control signal of FIG. 14*b*.

FIG. 16 schematically shows generation of the signal sequence according to FIG. 14b. This contains eight signal blocks B1 to B8 that have been calculated in accordance with the instantaneous pulse duty factor PWM and the data at inputs 126, 128. This is done with reference to the values $T_{L1}$ and $T_{L2}$ of FIG. 7 that are measured at input 124 (cf. steps S230, S232 in FIG. 16). Each block Bn has a pulse off-time and a pulse which follows that off-time. Block B1 is then outputted in S234 (OUT Block 1). In this context:

$$T_{M1} = T_{L1} - T_D \quad (1)$$

$$T_{M2} = T_{L2} + T_D \quad (2).$$

$T_D$ has the same meaning as in FIG. 6, to which the reader is referred.

An analogous calculation is made in S236:
for block B2

$$T_{M3} = T_{L1} - T_D \quad (3)$$

$$T_{M4} = T_{L2} + T_D \quad (4).$$

These two values are outputted as block B2.
Analogously for block B3 (cf. step S238):

$$T_{M5} = T_{L1} - T_D \quad (5)$$

$$T_{M6} = T_{L2} + T_D \quad (6).$$

These two values are outputted as block B3 (OUT Block B3).

In the subsequent steps S240, S242, S244, S246, and S248, blocks B4 to B8 are analogously calculated and are outputted as modulated PWM signals. The flow chart of FIG. 16 ends with step S250.

Figure 17:
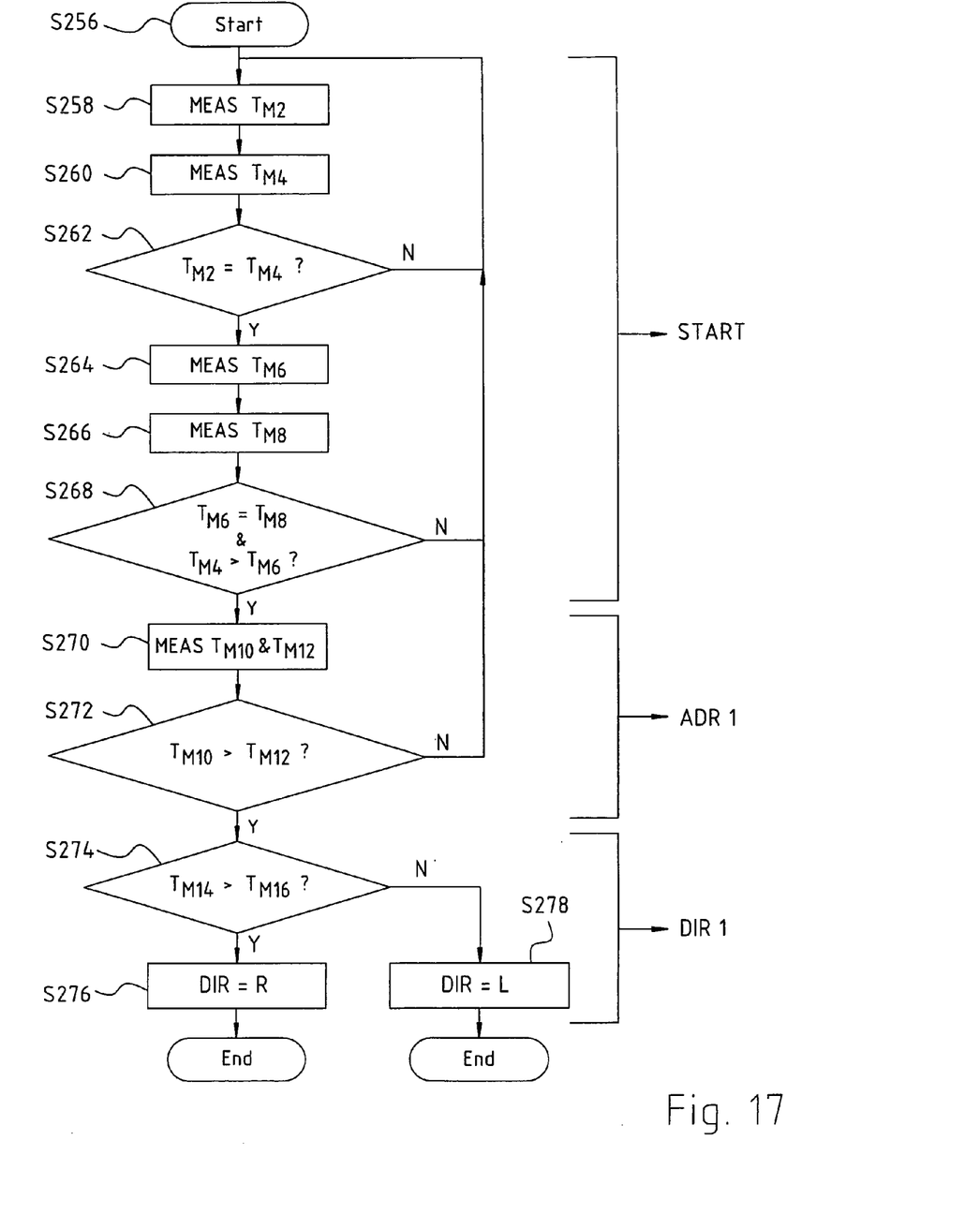
FIG. 17 is a flow chart showing the sequence upon readout of data from the modulated PWM signal of FIG. 14*b*.

Evaluation of the signal of FIG. 14b, for example in a motor or in another device to be controlled, is shown in FIG. 17.

After starting at S256, in the context of the signal sequence of FIG. 14b, the time $T_{M2}$ is measured in step S258, and the time $T_{M4}$ is measured in step S260, i.e. MEAS $T_{M2}$ and MEAS $T_{M4}$.

Step S262 tests whether these times are identical in magnitude. If No, that means a start signal 200 cannot be present, and the program returns to S258. If the response in S262 is Yes, then pulse duration $T_{M6}$ is measured in S264, and pulse duration $T_{M5}$ in S266.

S268 then checks whether $T_{M6} = T_{M5}$, and whether $T_{M4}$ is greater than $T_{M6}$, i.e. whether a start signal is present. If No, the program goes back to S258. If the response is Yes, a start signal 200 is present and the program proceeds to step S270, where pulse durations $T_{M10}$ and $T_{M12}$ are measured. The criterion here is that for an address signal 202, duration $T_{M10}$ must be greater than duration $T_{M12}$. This is therefore checked in S272, and if the response is No (i.e. an address is not present), the program goes back to S258.

If the response in S272 is Yes, pulse durations $T_{M14}$ and $T_{M16}$ are measured, and if $T_{M14}$ is greater than $T_{M16}$, which is tested in S274, the program goes to S276, where the instruction DIR=R (i.e. clockwise) is decoded. If the response in S274 is No, the program goes to S278, where the instruction DIR=L (i.e. counterclockwise) is decoded.

The power level of the motor being addressed is specified by the pulse duty factor PWM, which in accordance with FIG. 7 is evaluated from the ratio $T_{L2}/(T_{L1}+T_{L2})$, i.e. the power level of the motor, or its rotation speed, rises as the pulse duty factor increases.

Be it noted that the various parameters are preferably selected so that the ratio of important pulse lengths undergoes no change as a result of modulation with regard to operation of the motor. This is particularly evident in terms of start signal 200 depicted in FIG. 14b. Here the two longer blocks B1 and B2 are of identical length, and the two shorter blocks B3 and B4 are likewise of identical length, and these properties undergo no change as a result of modulation, so that the start signal can be easily and reliably sensed even after modulation. The same applies analogously to address signal 202 and rotation direction signal 204.

It is thereby possible to transfer the signal sequences either via separate signal leads or also by correspondingly driving the operating voltage that is delivered, for example in FIG. 5, to the two motors M1, M2 or heating elements 550, 560.

The invention therefore relates, inter alia, to an apparatus in which an arrangement for generating an address signal is provided, which arrangement can be activated in order to address a device in conjunction with the transfer of a modulated control signal to that device. The signal generating apparatus is preferably configured to transfer, prior to transfer of an address signal, a start signal START. The latter preferably contains a sequence of pulses that have the same pulse duration at least in pairs, and it preferably comprises a number of signal elements (e.g. B1, B2, B3, B4) that is greater than 2, for example 4.

Many variants and modifications are, of course, possible within the scope of the present invention.

What is claimed is:

1. An apparatus for generating a signal for controlling an electric motor (110), comprising:
   A) a signal generator (126) for generating a modulated control signal (PWM_mod) for driving the electric motor (110), which signal generator (126) is configured to generate said modulated control signal by modulating a data signal (DIR; ADR; DATA), having data provided for operation of the motor (110), onto a PWM signal (PWM) having a given pulse duty cycle, the resulting modulated control signal (PWM_mod) maintaining, on average, the same pulse duty cycle as said PWM signal prior to said modulation; and
   B) a transmitting unit (127) which, in operation, transfers said modulated control signal (PWM_mod) to the motor (110),
   wherein said modulated control signal (PWM_mod), prior to modulation thereof with the data signal, includes successive signal elements (710, 720, 730) that each comprise a pulse off-time (712, 722, 732) having a predetermined off-time duration ($T_{L1}$) and a pulse (714, 724, 734), subsequent thereto,
having a predetermined pulse duration ($T_{L2}$), the
off-time duration ($T_{L1}$) and pulse duration ($T_{L2}$) being correlated with an electrical power level to be applied to the motor (110).

2. The apparatus according to claim 1, wherein the signal generator (126) is configured to perform the steps of:
   B1) ascertaining the off-time duration ($T_{L1}$);
   B2) ascertaining the pulse duration ($T_{L2}$); and
   B3) modifying the off-time duration ($T_{L1}$) and pulse duration ($T_{L2}$) of at least two signal elements (720, 730), as a function of data contained in the data signal (DIR; ADR, DATA),
   while maintaining a predetermined value of said pulse duty factor.

3. An apparatus for generating a signal for controlling an electric motor (110), comprising:
   A) a signal generator (126) for generating a modulated control signal (PWM_mod) for driving the electric motor (110), which signal generator (126) is configured to generate said modulated control signal by modulating a data signal (DIR; ADR; DATA), having data provided for operation of the motor (110), onto a PWM signal (PWM) having a given pulse duty cycle, the resulting modulated control signal (PWM_mod) maintaining, on average,
the same pulse duty cycle as said PWM signal prior to said modulation; and B) a transmitting unit (127) which, in operation, transfers said modulated control signal (PWM_mod) to the motor (110);

wherein the signal generator (126) is configured, in order to specify a first rotation direction of said motor, to perform the steps of:

B3A) shortening the off-time duration ($T_{L1}$) of at least one first selected signal element (720) by an amount equal to a predetermined duration ($T_D$);

B3B) lengthening the pulse duration ($T_{L1}$) of the first signal element (720) by an amount equal to the predetermined duration ($T_D$);

B3C) lengthening the off-time duration ($T_{L1}$) of at least one second signal element (730) subsequent to the first selected signal element (720) by an amount equal to the predetermined duration ($T_D$); and B3D) shortening the pulse duration ($T_{L2}$) of said second signal element (730) by an amount equal to the predetermined duration ($T_D$).

4. An apparatus for generating a signal for controlling an electric motor (110), comprising:

A) a signal generator (126) for generating a modulated control signal (PWM_mod) for driving the electric motor (110), which signal generator (126) is configured to generate said modulated control signal by modulating a data signal (DIR; ADR; DATA), having data provided for operation of the motor (110), onto a PWM signal (PWM) having a given pulse duty cycle, the resulting modulated control signal (PWM_mod) maintaining, on average, the same pulse duty cycle as said PWM signal prior to said modulation; and B) a transmitting unit (127) which, in operation, transfers said modulated control signal (PWM_mod) to the motor (110);

wherein the signal generator (126) is configured, in order to specify a second rotation direction of said motor, to perform the steps of:

B3A) lengthening the off-time duration ($T_{L1}$) of at least one first selected signal element (720) by an amount equal to a predetermined duration ($T_D$);

B3B) shortening the pulse duration ($T_{L2}$) of the first signal element (720) by an amount equal to the predetermined duration ($T_D$);

B3C) shortening the off-time duration ($T_{L1}$) of at least one second signal element (730) immediately subsequent to the first selected signal element (720) by an amount equal to the predetermined duration ($T_D$); and B3D) shortening the pulse duration ($T_{L2}$) of the second signal element (730) by an amount equal to the predetermined duration ($T_D$).

5. An apparatus for generating a signal for controlling an electric motor (110), comprising:

A) a signal generator (126) for generating a modulated control signal (PWM_mod) for driving the electric motor (110), which signal generator (126) is configured to generate said modulated control signal by modulating a data signal (DIR; ADR; DATA), having data provided for operation of the motor (110), onto a PWM signal (PWM) having a given pulse duty cycle, the resulting modulated control signal (PWM_mod) maintaining, on average, the same pulse duty cycle as said PWM signal prior to said modulation; and B) a transmitting unit (127) which, in operation, transfers said modulated control signal (PWM_mod) to the motor (110);

wherein said transmitting unit (127) modulates the PWM signal onto the supply voltage (Ub) for the electric motor (110); and wherein said modulated control signal (PWM_mod), prior to modulation thereof with the data signal, includes successive signal elements (710, 720, 730) that each comprise a pulse off-time (712, 722, 732) having a predetermined off-time duration (TL1) and a pulse (714, 724, 734), subsequent thereto, having a predetermined pulse duration (TL2), the off-time duration (TL1) and pulse duration (TL2) being correlated with an electrical power level to be applied to the motor (110).

6. An electric motor having
a stator (465),
a rotor (470), and
an apparatus for evaluating a modulated control signal (PWM_mod) deliverable in order to drive said motor (110), the improvement comprising A) a receiving unit (430, 440) which receives the modulated control signal (PWM_mod), which signal is constituted by modulating a data signal (DIR; DATA), having data provided for operation of the motor (110), onto a pulse width modulated signal (PWM) having a given average pulse duty cycle, the resulting modulated control signal (PWM_mod) maintaining, on average, the same pulse duty cycle as said PWM signal prior to said modulation;

B) an evaluation unit (440) which evaluates the modulated control signal (PWM_mod), which unit is configured to ascertain, on the basis of the modulated control signal (PWM_mod), data for operation of the motor (110) contained in said modulated control signal; and C) an arrangement (450) which, in operation, generates, on the basis of said ascertained data, at least one driving signal for the motor (110).

7. The electric motor according to claim 6, wherein the evaluation unit (440) for evaluating the modulated control signal (PWM_mod) is configured to derive, from said modulated control signal, a pulse duty factor that is suitable for power level control of the motor (110).

8. The electric motor according to claim 6, wherein the evaluation unit (440) is configured to perform, in the context of evaluation of the modulated control signal (PWM_mod), the steps of:

B1) measuring the pulse duration ($T_{M2}$) of a reference signal element (810; 910);

B2) measuring the pulse duration ($T_{M4}$) of a first signal element (820; 920) subsequent thereto;

B3) measuring the pulse duration ($T_{M6}$) of a second signal element (830; 930);

B4) if the pulse duration ($T_{M2}$) of the reference signal element (810; 910) is greater than the pulse duration ($T_{M4}$) of the first signal element (820; 920) and less than the pulse duration ($T_{M6}$) of the second signal element (830; 930), controlling the motor (110) into operation in a first rotation direction; and B5) if the pulse duration ($T_{M2}$) of the reference signal element (810; 910) is greater than the pulse duration ($T_{M4}$) of the second signal element (830; 930) and less than the pulse duration ($T_{M6}$) of the first signal element (820; 920), controlling the motor (110) into operation in a second rotation direction.

9. A method of generating a signal for controlling an electrical load, which method comprises the steps of:
- A) generating a pulse width modulated signal (PWM) having a predetermined average pulse duty factor; and
- B) modulating, onto said pulse width modulated signal, a data signal (DIR; DATA) having data provided for operation of the load, in order to generate a modulated control signal (PWM_mod) having the predetermined average pulse duty factor of the pulse width modulated signal (PWM); and wherein the pulse width modulated signal (PWM) includes successive signal elements (Block 1, Block 2, Block 3) that are each composed of a pulse off-time having a predetermined off-time duration ($T_{L1}$) and a pulse subsequent thereto having a predetermined pulse duration ($T_{L2}$), the off-time duration ($T_{L1}$) and the pulse duration ($T_{L2}$) being predetermined as a function of the power level to be delivered to the load.

10. The method according to claim 9, further comprising the steps of:
- B1) ascertaining the off-time duration ($T_{L1}$);
- B2) ascertaining the pulse duration ($T_{L2}$); and
- B3) modifying the off-time duration ($T_{L1}$) and pulse duration ($T_w$) of at least two signal elements (Block 1, Block 2, Block 3) as a function of data contained in the data signal (DIR) while maintaining a predetermined value of said pulse duty factor.

11. The method according to claim 10, wherein the data signal (DIR, DATA) specifies an operating parameter of the load.

12. The method according to claim 11, wherein said modifying step B3) for specifying a second operating parameter comprises:
- B3A) lengthening the off-time duration ($T_{L1}$) of at least one first selected signal element (Block 2) by an amount equal to a predetermined duration ($T_D$);
- B3B) shortening the pulse duration ($T_w$) of the first signal element (Block 2) by an amount equal to the predetermined duration ($T_D$);
- B3C) shortening the off-time duration ($T_{L1}$) of at least one second signal element (Block 3) immediately subsequent to the first selected signal element (Block 2) by an amount equal to the predetermined duration ($T_D$); and
- B3D) shortening, the pulse duration ($T_w$) of the second signal element (Block 3) by an amount equal to the predetermined duration ($T_D$).

13. The method according to claim 10, wherein said modifying step B3) comprises:
- B3A) shortening the off-time duration ($T_{L1}$) of at least one first selected signal element (Block 2) by an amount equal to a predetermined duration ($T_D$);
- B3B) lengthening the pulse duration ($T_w$) of the first signal element (Block 2) by an amount equal to the predetermined duration ($T_D$);
- B3C) lengthening the off-time duration ($T_{L1}$) of at least one second signal element (Block 3) immediately subsequent to the first selected signal element (Block 2) by an amount equal to the predetermined duration ($T_D$); and
- B3D) shortening the pulse duration ($T_{L2}$) of the second signal element (Block 3) by an amount equal to the predetermined duration ($T_D$).

* * * * *